United States Patent [19]
Snyder et al.

[11] 3,756,219
[45] Sept. 4, 1973

[54] ELECTRIC OVEN TOASTER DOOR MECHANISM

[75] Inventors: Paul V. Snyder, Whitehall; Willard F. Schultz, Bethlehem, both of Pa.

[73] Assignee: General Electric Company

[22] Filed: Jan. 19, 1973

[21] Appl. No.: 325,104

[52] U.S. Cl................ 126/191, 126/194, 16/135, 99/385, 217/60, 219/391, 219/521
[51] Int. Cl. ........................................... F24c 15/04
[58] Field of Search.................. 219/385, 386, 395, 219/391, 413, 521; 99/385, 191, 194, 334, 335; 126/340; 16/135; 217/60

[56] References Cited
UNITED STATES PATENTS

| 887,834 | 5/1908 | Nelson | 217/60 |
|---|---|---|---|
| 2,259,970 | 10/1941 | Benzick | 16/135 |
| 3,086,511 | 4/1963 | Loch | 126/335 |
| 3,119,000 | 1/1964 | Loch et al. | 219/413 |
| 3,658,050 | 4/1972 | Snyder | 126/340 |
| 3,660,637 | 5/1972 | Grove | 219/413 |

Primary Examiner—Volodymyr Y. Mayewsky
Attorney—George R. Powers, Leonard J. Platt et al.

[57] ABSTRACT

An electric oven toaster construction wherein a unique door holding mechanism is provided for holding a door in its open or closed position. A pair of door arms are pivotally mounted on upper central portions of the oven toaster side walls and an overcenter compression spring assembly is positioned at a generally central portion of one of the side walls between a toaster door arm and the side wall.

10 Claims, 5 Drawing Figures

PATENTED SEP 4 1973 3,756,219

ELECTRIC OVEN TOASTER DOOR MECHANISM

BACKGROUND OF THE INVENTION

This invention relates to an electric oven toaster of the type which may be used to toast bread or cook convenience foods such as frozen pizzas and TV dinners, and more particularly, to a door mechanism of such an oven toaster.

Electric oven toasters conventionally include side, top and bottom walls and a door for opening and closing a front opening. As shown in a prior U.S. Pat. No. 3,086,511 to Loch, assigned to the same assignee as the present invention, a cooking chamber has a front opening and a door for the front opening is mounted on a pair of arms which are pivotally supported on walls of the cooking chamber. The door is opened and lifted upwardly at the end of a cooking cycle by a tension spring which holds the door in its upper open position.

In other prior art constructions a front door for such an oven toaster is pivotally mounted at the lower portion of the oven toaster so that it can be opened by moving the top portion of the door away from the oven toaster to pivot the door about its lower hinges until the door is moved to its lower open generally horizontal position. Spring mechanisms such as those shown in prior patents to Snyder U.S. Pat. No. 3,658,050 and Grove U.S. Pat. No. 3,660,637, both assigned to the same assignee as the present invention, have been effectively used in those oven toasters where a front door is pivoted to the lower portion of the toaster.

While the basic components of a door operating mechanism, namely, springs, arms and levers have been well known, it is especially desirable that they be connected and related to each other to a door and to the other components of an oven toaster so that the door may be reliably opened and closed and the space requirements of the door and the oven toaster are minimized.

It is also desirable that such door operating mechanisms be constructed of as little material as possible and readily and inexpensively incorporated into an oven toaster appliance.

Accordingly, it is a particular object of this invention to provide a reliable oven toaster door mechanism which may be readily and conveniently operated to move and hold an oven toaster door in an open or a closed position.

It is another object of our invention to provide an improved oven toaster door mechanism which has relatively low space requirements and which may be readily and quickly attached to an oven toaster door with the use of relatively few parts.

SUMMARY OF THE INVENTION

In accordance with one of the aspects of this invention, an electric oven toaster includes two generally vertical side walls, a top wall and a front opening. A door is provided for closing the front opening and a pair of rearwardly extending arms are fixed to the door for supporting the door on the oven toaster. Suitable hinge connections are provided at the end portions of each of the arms for hinging the door arms at the upper sides of the oven toaster. A compression spring is uniquely positioned at the side of the oven toaster with one of its ends movably connected to one of the door arms between the door arm hinge connection and the door. The other end portion of the spring is connected to the oven toaster below the door arm hinge connection. A handle or other manual means is connected to the oven toaster door for permitting the door to be manually opened or closed. The compression spring is overcentered with respect to the door arm hinge so that as the door is manually closed the upper end of the spring is moved toward the lower end of the spring to compress the spring, the spring then overcenters the hinge connection, and following the overcentering movement the upper end of the spring will move away from the lower end of the spring and provide a force on the door arm to move and hold the door in its closed position. As the door handle is operated to open the door the upper end of the spring is moved toward the lower end of the spring to compress the spring, the spring then overcenters the hinge connection and ultimately the spring provides a force on the door arm to fully open the door and hold it in its open position.

With this construction, a low cost relatively weak compression spring may be used for holding an oven toaster door not only in its open position but in its closed position. The unique arrangement also permits the use of relatively short door arms with a resulting saving in sheet metal and the relatively short door arms reduce the overall space requirements of the door as it is moved between its open and closed positions. Moreover, the overall construction is rugged, and the door may be reliably opened and closed. Thus, an exceedingly simple, reliable, and readily manufactured oven toaster door operating mechanism has been achieved.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
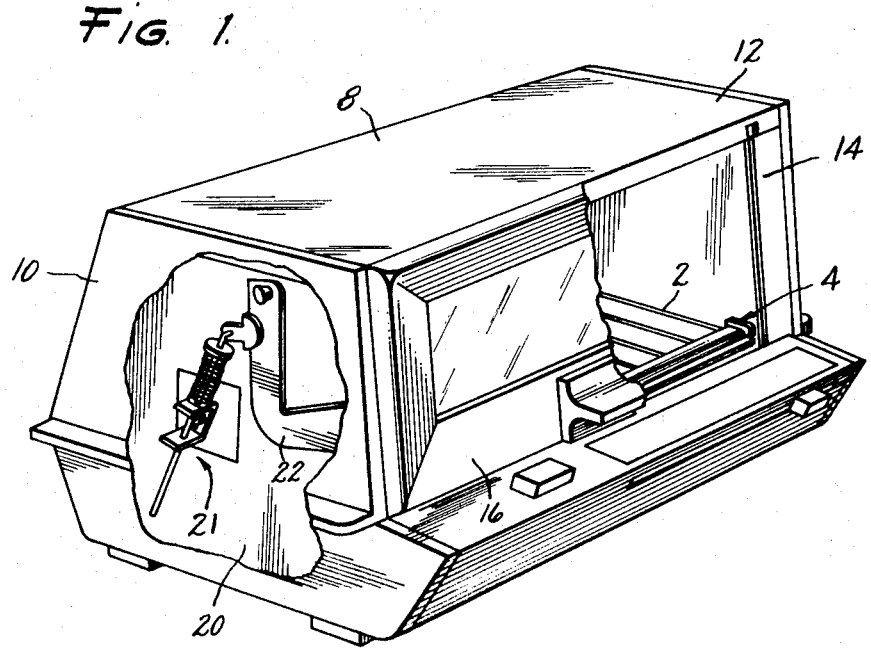
FIG. 1 is a front perspective view of an electric oven toaster construction embodying our invention partially broken away to show details of construction.

Referring now to the drawing and first particularly to FIG. 1, there is shown an electric oven toaster which includes a toasting and oven chamber 2 in which is mounted a generally horizontal food rack 4 for holding food to be cooked or bread to be toasted. The oven toaster includes a generally horizontal top wall 8, generally parallel vertical side walls 10 and 12, and a front opening 14 to provide access to the inside of the oven toaster. A front door 16 is provided for closing the front opening 14. Each of the side walls 10 and 12 of the oven toaster include an outer panel wall member 18 and an inner generally vertical side plate 20.

Figure 2:
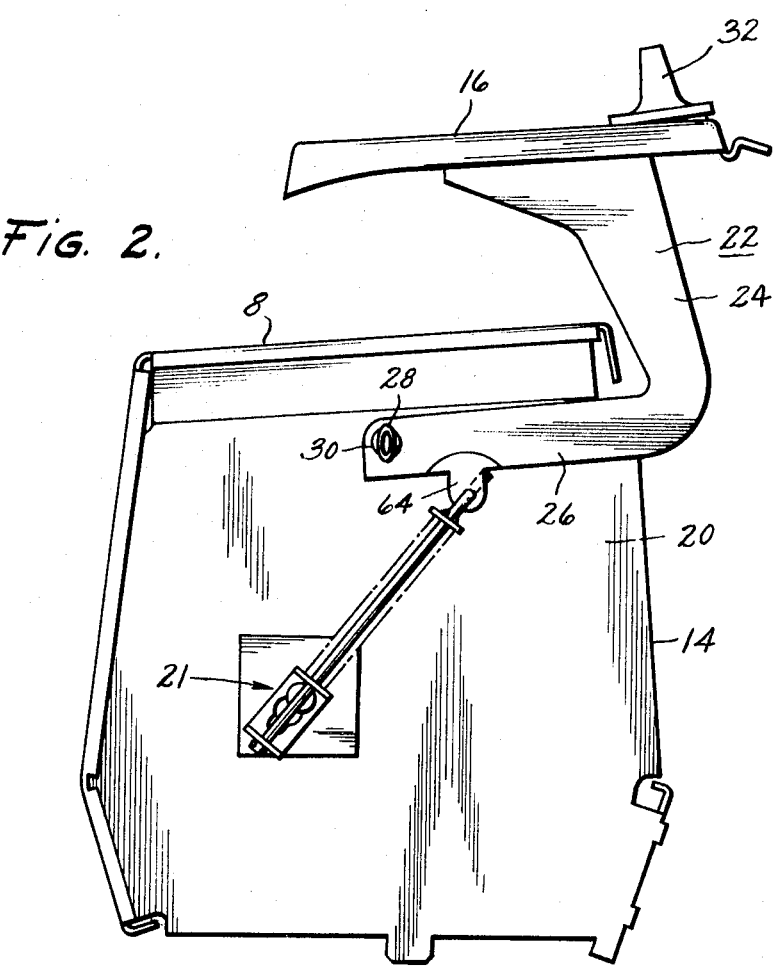
FIG. 2 is a cross-sectional view of the electric oven toaster shown in FIG. 1 taken substantially on the plane of 2—2 of FIG. 1 showing the oven toaster door in its open position with our unique overcenter compression spring arrangement holding the door in its open position.

According to our invention, there is uniquely combined with the afore-described electric oven toaster a reliable low cost door arm and hinge mechanism and a unique compression spring mechanism 21 for holding the door 16 in an open or a closed position. As shown in FIG. 1, the door arm and hinge mechanism is located between the outer panel members and the inner sheet metal side plates of the vertical side walls. The mechanism is uniquely designed so that relatively short and inexpensive sheet metal door arms 22 may be used for supporting the oven toaster door 16 which is lifted above the oven toaster in its open position, as shown in FIG. 2. It can be seen that the door arms 22 are generally L-shaped and include a first arm portion 24 which is ridgedly connected to the door 16 and a second arm portion 26 which is integrally formed with the first arm portion. As shown, the first arm portion 24 extends generally perpendicular to the plane of the door 16, while the second arm portion 26 is arranged generally parallel to the door, and generally perpendicular to the first arm portion. A hinge pin 28 is suitably fixed to each of the inner sheet metal vertical side plates 20 for receiving an aperture 30 which is formed in the end portions of the second arm portions of the door support arms.

Figure 3:
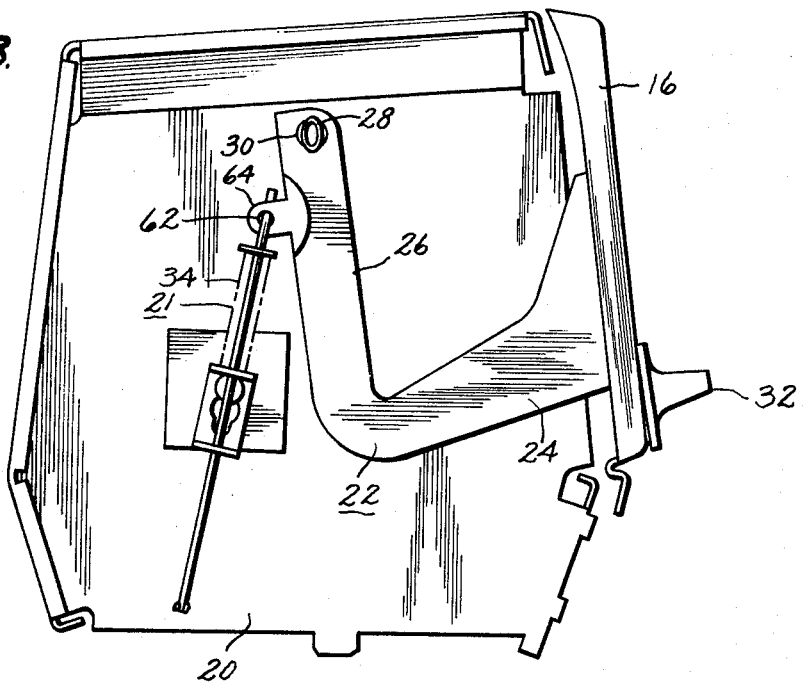
FIG. 3 is a cross-sectional view of the electric oven toaster similar to FIG. 2 showing the door in its closed position with our improved overcenter compression spring mechanism holding the door in its closed position.

With reference to FIGS. 2 and 3, it can be seen that the hinge pin 28 is located at the upper central portion of the vertical side plate 20 and with this construction it can be appreciated that the length of each of the door arm portions 24 and 26 is about one half of the width of the vertical side wall 20. Thus, with the door 16 in its full open position illustrated in FIG. 2, the door rests in a generally horizontal position a short distance above the top wall 8 of the oven toaster, and the overall space required for moving the door from its closed position illustrated in FIG. 3 to its open position illustrated in FIG. 2 is relatively small.

Our unique overcenter compression spring mechanism 21 is constructed as a subassembly which may be quickly connected to the second arm portion 26 of the oven toaster and to the vertical side wall 20 of the oven toaster. As shown more particularly in FIG. 4, the subassembly includes a coil compression spring 34 having an upper end portion 36 and a lower end portion 38. A rod 40 extends through the compression spring for suitably guiding the spring and for allowing a relatively weak low cost spring to be utilized. A stop washer 42 having an aperture 44 formed therein is provided with a lower surface 46 in abutting relationship with the upper end 36 of the coil spring to suitably confine the upper end of the spring. In a generally similar manner, a U-shaped bracket 48 is formed with two apertures 50 and 52 in arms 54 and 56 of the U for receiving the lower end of the rod 40 in order to confine the lower end of the spring. With the parts in their subassembled position illustrated in FIG. 4, the upper and lower ends of the rod are offset to form protrusions 58 and 60 above the stop washer 42 and below the lower arm 56 to hold the parts in their subassembled positions on the rod.

In order to quickly pivotally connect the upper portion of the compression spring assembly to the second arm portion 26 of the oven toaster, the upper end of the rod is offset in an L-shape at 61 and an aperture 62 is formed in the second arm portion 26 for receiving the end 61 of rod 40. In the embodiment illustrated, the second arm 26 includes an offset portion 64 and the aperture 62 is formed in the offset portion in order to provide the desired overcentering action in the embodiment illustrated.

Figure 4:
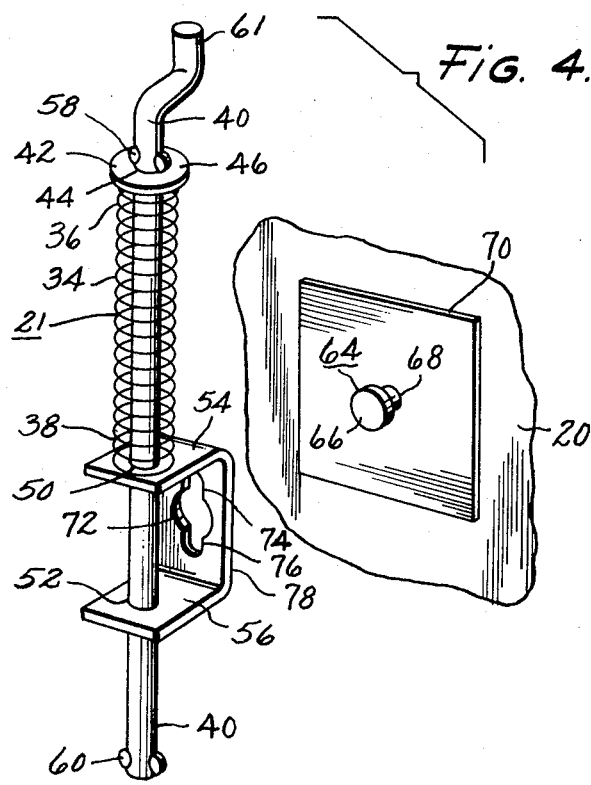
FIG. 4 is a fragmentary exploded perspective view of a portion of our unique overcenter compression spring arrangement for holding an oven toaster door in its closed or open position.

Our improved construction is also designed so that the lower end portion 38 of the compression spring may be readily connected to the vertical wall 20 of the oven toaster below the door arm hinge connection 28. As shown in FIG. 4, a rivet 64 having a head 66 and a reduced shank portion 68 securely holds a plastic or other suitable washer 70 to the side plate 20 of the oven toaster. The rivet 64 functions as a pivot connection for the U-shaped bracket 48, and as shown, a keyhole slot 72 is formed with a central enlarged aperture of a size to receive the head of the rivet and upper and lower end slots 74 and 76 slightly larger than the shank portion 68 of the rivet. The washer 70 may be formed of plastic or other suitable material for slidable engagement with a back surface 78 of the U-shaped bracket.

Figure 5:
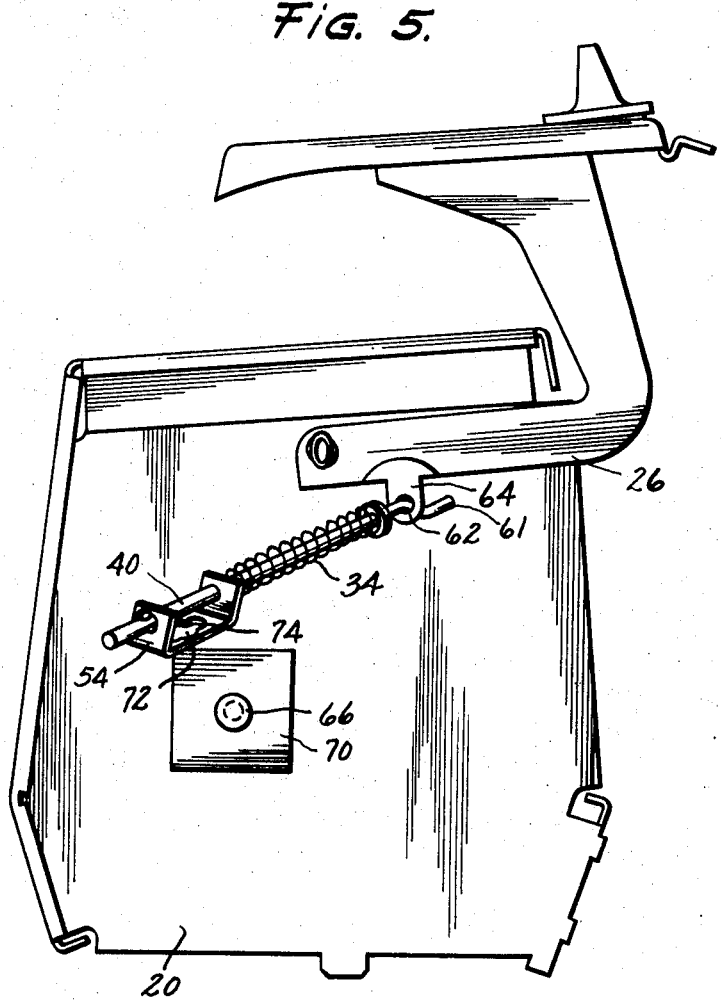
FIG. 5 is a cross-sectional view of the electric oven toaster similar to FIG. 2 showing our compression spring subassembly being connected to the oven toaster.

FIG. 5 shows the compression spring subassembly being connected to the oven toaster. It can be seen that the upper end 61 of rod 40 is simply inserted within aperture 62 with the rod being somewhat perpendicular to the plane of second arm 26. The assembly is then lowered to place the edges of the aperture 62 in engagement with the L-shaped portion of the rod. The spring 34 is then compressed by sliding the bracket 54 along the rod until the large diameter hole 72 of the keyhole can be placed over and behind the head 66 of the rivet. When the manual compression force is removed the spring 34 will push bracket 54 downwardly causing the slot 74 to slide behind the head 66 of the rivet thereby holding the bracket between the head of the rivet 66 and the washer 70.

Our overcenter compression spring subassembly 21 is uniquely located with respect to the door arm hinge pin 28, the pivotal connection 62 for the upper end of the compression spring, and the pivotal connection 68 for the lower end of the compression spring so that the compression spring 34 is not only overcentered to hold the door in an open or closed position, but it is overcentered to assist manual movement of the door from an open to a closed position. In the door closed position illustrated in FIG. 3, compression spring 34 exerts a force to the left of the hinge pivot pin 28 developing a clockwise moment about the hinge, and thus, the door is held closed. As the door is opened by manually moving handle 32 upwardly the door arm 26 is rotated about the pivot pin 28 as the manually applied forces compress the spring 21 to move the upper end portion of the spring toward the lower end portion of the spring. As the door becomes partially open the compression spring overcenters the pivot 28 and very little additional manual force is required for lifting the door to its full open position since the compression spring then exerts an upward counterclockwise force on the arm 26 as the upper portion of the compression spring 34 is moved away from the lower portion of the compression spring.

When the door is moved from its open position illustrated in FIG. 2 to its closed position illustrated in FIG.

3, the second arm portion 26 of the door rotates in a clockwise direction about pivot pin 29 to compress the spring by moving the upper end of the spring toward the lower end portion of the spring, the spring overcenters the pivot pin 28 and the final substantially rearward movement of the door to the door closed position can be accomplished by the compression spring 34 as the upper end portion of the spring moves away from the lower end portion of the spring to exert a clockwise moment on the second arm portion of the door support arm.

With this construction it can be appreciated that the pivot support 28 for the door arm is centrally positioned between the front and the rear of the oven toaster so that relatively short door support arms 26 may be utilized to decrease the amount of travel of the door and the overall space required for moving the door from its open position illustrated in FIG. 2 to its closed position illustrated in FIG. 3. Moreover, the overcenter compression spring is uniquely related to the door arm so that the rearward movement of the door to its door open position illustrated in FIG. 2, and its door closed position illustrated in FIG. 3 may be accomplished under the action of the compression spring as the upper portion of the spring 34 moves away from the lower portion of the spring.

From the foregoing description it will also be appreciated that our unique door holding mechanism may be manufactured at relatively low cost. The unique arrangement permits the use of relatively short door arms with a resulting saving in sheet metal and the low cost compression spring is effectively and reliably guided by the rod 40 which smoothly slides within the apertures 50 and 52 of the U-shaped bracket 54 as the door is opened and closed. Thus, an exceedingly simple, rugged, reliable and readily manufactured oven toaster door operating mechanism has been achieved.

What we claim is:

1. An electric oven toaster construction having a toasting and oven chamber and electric heating elements in said chamber, said oven toaster construction including two generally vertical side walls, a top wall, and a front opening comprising:
   a. a door for closing said front opening;
   b. a pair of arms fixed to said door and extending rearwardly therefrom;
   c. a pair of hinge connections for each of said arms mounted on the oven toaster for supporting said door for movement from an open to a closed position with respect to said front opening;
   d. a compression spring having two end portions, a first end portion of said spring being connected to one of said arms between its hinge connection and the door and a second end portion of said spring being connected to said oven toaster below the arm hinge connection;
   e. manual means connected to the door for permitting the door to be manually opened and closed, the first end portion of said spring being moved toward the second end portion of the spring to compress the spring as the door is moved from its open position to its closed position, said spring overcentering the hinge connection during the movement of the door from its open to its closed position, and the first end portion of said spring being moved to exert a force on said one of said arms to hold the door in its closed position, the first end portion of said spring also being moved toward the second end portion of the spring to compress the spring as the door is moved from its closed position to its open position, said spring overcentering the hinge connection during this movement of the door from its closed position to its open position, and the first end portion of said spring then being moved to exert a force on said one of said arms to hold the door in its open position.

2. An electric oven toaster construction as defined in claim 1 wherein each of said door arms includes a first arm portion connected to said door and extending generally perpendicular thereto and a second arm portion which extends generally parallel to the door, said arm portions being approximately the same length as each other and being approximately one half of the width of said vertical side wall to permit the door to be held in a generally horizontal open position close to the top wall of the oven toaster.

3. An electric oven toaster construction as defined in claim 1 wherein each of said pair of hinge connections for the door arms includes a hinge pin which is fixed to the upper central portion of one of the vertical side walls.

4. An electric oven toaster construction as defined in claim 1 wherein the connection of the second end portion of the spring includes a pivot pin fixed to the lower central portion of said vertical side wall below and rearwardly from the door arm hinge pivot pin.

5. An electric oven toaster construction as defined in claim 1 wherein said compression spring comprises a compression spring subassembly including:
   a. a coil compression spring having two end portions; and
   b. a rod extending through said compression spring.

6. An electric oven toaster construction as defined in claim 1 wherein said compression spring comprises a compression spring subassembly including:
   a. a coil compression spring having two end portions;
   b. a rod extending through said compression spring; and
   c. a stop washer having an aperture formed therein positioned over the upper portion of said rod having a surface thereof in abutting relationship with the upper end of said spring.

7. An electric oven toaster construction as defined in claim 1 wherein said compression spring comprises a compression spring subassembly including:
   a. a coil compression spring having two end portions;
   b. a rod extending through said compression spring;
   c. a stop washer having an aperture formed therein positioned over the upper portion of said rod having a surface thereof in abutting relationship with the upper end of said spring;
   d. a U-shaped stop bracket having apertures formed in the arms of the U for receiving the lower end of said rod; and
   e. a plurality of protrusions formed on said rod above said stop washer and a plurality of protrusions formed on said rod below said U-shaped bracket for holding and sandwiching the washer, coil compression spring, and U-shaped bracket in subassembled position.

8. An electric oven toaster construction as defined in claim 1 wherein said compression spring comprises a compression spring subassembly including:
   a. a coil compression spring having two end portions;

b. a rod extending through said compression spring;
c. a stop washer having an aperture formed therein positioned over the upper portion of said rod having a surface thereof in abutting relationship with the upper end of said spring;
d. a U-shaped stop bracket having apertures formed in the arms of the U for receiving the lower end of said rod;
e. a plurality of protrusions formed on said rod above said stop washer and a plurality of protrusions formed on said rod below said U-shaped bracket for holding and sandwiching the washer, coil compression spring, and U-shaped bracket in subassembled position;
f. the upper end of said rod being L-shaped for insertion within an aperture formed in the second arm portion of said door arm to pivotally connect the compression spring subassembly to said door arm; and
g. a keyhole slot formed in the bight portion of said U-shaped bracket.

9. An electric oven toaster construction as defined in claim 8 wherein a pivot pin is fixed to the lower central portion of the vertical side wall of the oven toaster below and rearwardly from the door arm hinge pivot pin, and said keyhole slot is positioned over said lower pivot pin for connecting the lower end of said compression spring subassembly to said oven toaster.

10. An electric oven toaster construction having a toasting and oven chamber and electric heating elements in said chamber, said oven toaster construction including two generally vertical side walls, a top wall, and a front opening comprising:
a. a door for closing said front opening;
b. a pair of arms fixed to said door and extending rearwardly therefrom; each of said arms including a first arm portion connected to said door and extending generally perpendicular thereto and a second arm portion integrally formed with said first arm portion extending generally parallel to the door;
c. a pair of door arm hinge pins fixed to the upper central portions of said vertical side walls;
d. an aperture formed in the free end portions of each of said second door arm portions for receiving said hinge pins;
e. an overcenter compression spring subassembly including:
  e1. a coil compression spring having two end portions;
  e2. a rod extending through said compression spring;
  e3. a stop washer having an aperture formed therein positioned over the upper portion of said rod having a surface thereof in abutting relationship with the upper end of said spring;
  e4. a U-shaped stop bracket having apertures formed in the arms of the U for receiving the lower end of said rod;
  e5. a plurality of protrusions formed on said rod above said stop washer and a plurality of protrusions formed on said rod below said U-shaped bracket for holding and sandwiching the washer, coil compression spring, and U-shaped bracket in subassembled position;
  e6. the upper end of said rod being L-shaped for insertion within an aperture formed in the second arm portion of said door arm to pivotally connect the compression spring subassembly to said door arm; and
  e7. a keyhole slot formed in the bight portion of said U-shaped bracket;
f. a pivot pin fixed to the lower central portion of said vertical side wall below and rearwardly from the door arm hinge pivot pin, said keyhole slot being positioned over said lower pivot pin for connecting the lower end of said compression spring subassembly to said oven toaster; and
g. manual means connected to the door for permitting the door to be manually opened and closed, the stop washer being moved downwardly to compress the coil spring between the stop washer and one of the arms of the U-shaped bracket as the door is moved from its open position to its closed position, said spring overcentering the door arm hinge pivot pin during movement of the door from its open position to its closed position, and said stop washer being moved upwardly by said compression spring to exert a force on the second arm portion of the door arm to hold the door in its closed position.

* * * * *